United States Patent [19]

Kobayashi et al.

[11] Patent Number: 5,520,265
[45] Date of Patent: May 28, 1996

[54] FRICTION PAD FOR DISK BRAKE WITH WEAR SENSOR

[75] Inventors: Kinzo Kobayashi; Shinji Suzuki; Takahiro Tokunaga, all of Yamanashi-ken, Japan

[73] Assignee: Tokico Ltd., Kanagawa-ken, Japan

[21] Appl. No.: 350,157

[22] Filed: Nov. 29, 1994

[30] Foreign Application Priority Data

Nov. 29, 1993 [JP] Japan ................................ 5-323154

[51] Int. Cl.⁶ ........................................ F16D 66/02
[52] U.S. Cl. .................... 188/1.11; 188/250 G; 29/524.1
[58] Field of Search ................... 188/1.11 R, 1.11 W, 188/73.1, 73.31, 250 G, 250 B, 258; 29/509, 522.1, 524.1

[56] References Cited

U.S. PATENT DOCUMENTS

| 846,755 | 3/1907 | Newbaker | 188/250 B X |
|---|---|---|---|
| 2,067,677 | 1/1937 | Murphy | 188/250 G |
| 5,033,590 | 7/1991 | Kobayashi et al. | 188/1.11 W |

FOREIGN PATENT DOCUMENTS

| 0440041 | 8/1991 | European Pat. Off. | 188/73.1 |
|---|---|---|---|
| 2904436 | 8/1980 | Germany | 188/1.11 |
| 0079435 | 3/1989 | Japan | 188/1.11 W |

*Primary Examiner*—Matthew C. Graham
*Assistant Examiner*—Peter M. Poon
*Attorney, Agent, or Firm*—Wenderoth, Lind & Ponack

[57] ABSTRACT

A friction pad for a disk brake is designed so that a wear sensor can be firmly secured to the friction pad. A circular cylindrical projection is formed on a backing plate of the friction pad by extrusion so that a wear sensor adapted to sound an alarm by coming in contact with a disk is fitted onto the projection and secured to the backing plate by caulking the projection. The projection is so deformed that the diameter $d_1$ and height $h_1$ of a resulting radially enlarged portion satisfy the relationship of $(d_1-3.4) \times h_1 \geq 2.5$, thereby preventing rotation of the wear sensor and rising of the enlarged portion.

6 Claims, 6 Drawing Sheets ar
FRICTION PAD FOR DISK BRAKE WITH WEAR SENSOR

BACKGROUND OF THE INVENTION

The present invention relates to a friction pad of a disk brake for use on a vehicle.

It is known in the art of disk brakes that a wear sensor is attached to a friction pad of a disk brake so that when the friction pad becomes worn to a predetermined extent, the wear sensor comes in contact with the disk to sound an alarm, thereby warning the user that the pad has become worn.

In a disk brake provided with such a wear detecting ability, a friction pad is composed of a backing plate and a lining material joined thereto. The backing plate is provided with a circular cylindrical projection. After being fitted with a wear sensor, the circular cylindrical projection is caulked (i.e., plastically deformed to clamp the sensor), thereby attaching the wear sensor to the backing plate.

The wear sensor attached in this way suffers, however, from the problem that the wear sensor undesirably rotates about the projection when subjected to force from the disk by coming into contact therewith. Further, when the wear sensor receives an axial force from the disk, the mounting portion of the wear sensor, which is secured to the backing plate, causes the radially enlarged portion of the projection (i.e., the head thereof) to be deformed. Consequently, the wear sensor is displaced apart from the surface of the backing plate, and this causes the position of the wear sensor to change, resulting in a change in characteristics enabling a correct alarm.

SUMMARY OF THE INVENTION

An object of the present invention is to provide a friction pad which is free from the above-described problems.

The present invention provides a friction pad for a disk brake, which is composed of a backing plate and a lining material joined thereto. The backing plate has a circular cylindrical projection previously formed thereon by extrusion so that a wear sensor adapted to sound an alarm by coming in contact with a disk is fitted onto the projection and secured to the backing plate by caulking the projection. The projection is so deformed that the diameter $d_1$ and height $h_1$ of the resulting radially enlarged portion of the projection satisfy the relationship of $(d_1-3.4)\times h_1 \geq 2.5$.

BRIEF DESCRIPTION OF THE DRAWINGS

The above and other objects, features and advantages of the present invention will become more apparent from the following description of the preferred embodiments thereof, taken in conjunction with the accompanying drawings, in which like reference numerals denote like elements, and of which.

DETAILED DESCRIPTION

Prior to the description of the present invention, the prior art will be explained more specifically to enable the present invention to be understood even more clearly.

Figure 8:
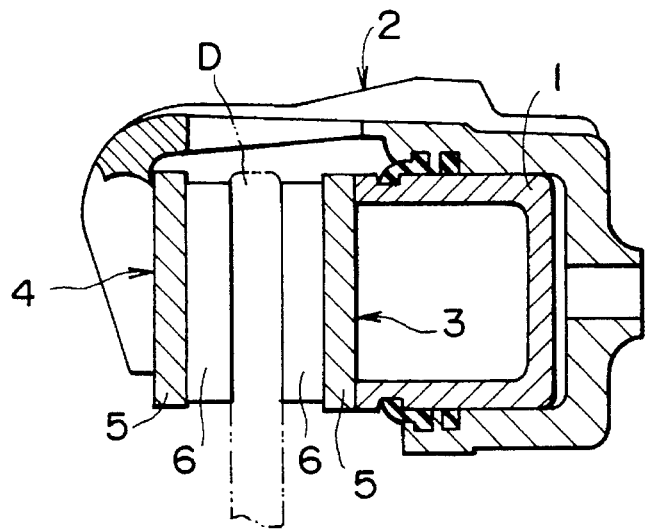
FIG. 8 is a sectional view showing the whole structure of a disk brake.

As shown in FIG. 8, a typical disk brake has a carrier (not shown) attached to a non-rotating part of a vehicle body. The carrier supports a caliper 2, which has a piston 1 slidably fitted therein, in such a manner that the caliper 2 is floatable in the axial direction. The carrier further supports a pair of friction pads 3 and 4 on both sides of a disk D such that the friction pads 3 and 4 are movable in the axial direction. In operation, forward movement of the piston 1 causes one friction pad (inner pad) 3 to press against one side of the disk D and allows the caliper 2 to move in the opposite direction to that of the movement of the piston 1 by the reaction resulting from the pressing force applied by the piston 1, causing the other friction pad (outer pad) 4 to press against the other side of the disk D. In this way, the disk D is clamped between the two friction pads 3 and 4 to produce braking force.

Figure 9:
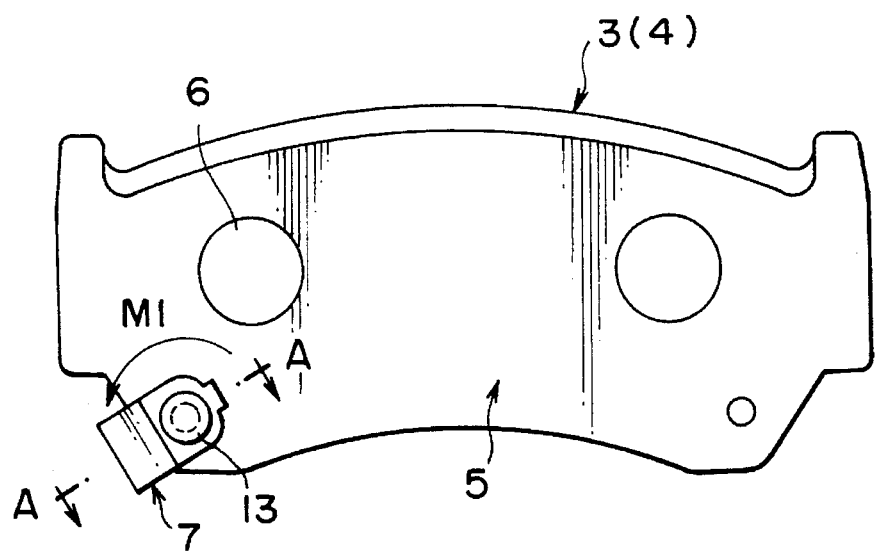
FIG. 9 is a plan view showing the configuration of a conventional friction pad equipped with a wear sensor.
Figure 10:
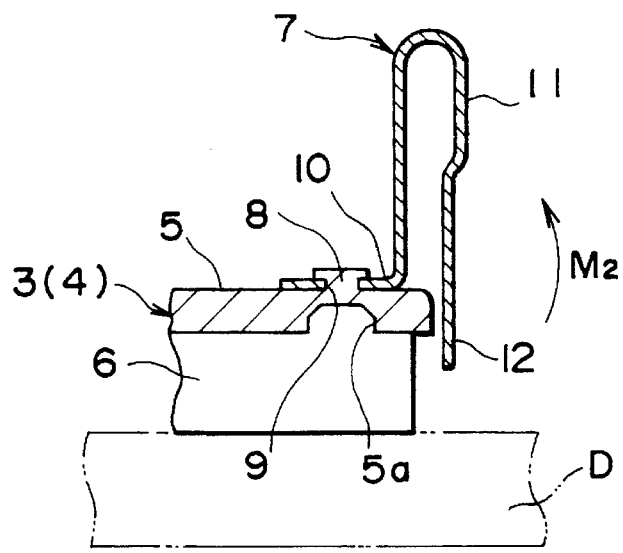
FIG. 10 is a sectional view taken along the line X—X in FIG. 9.
Figure 11:
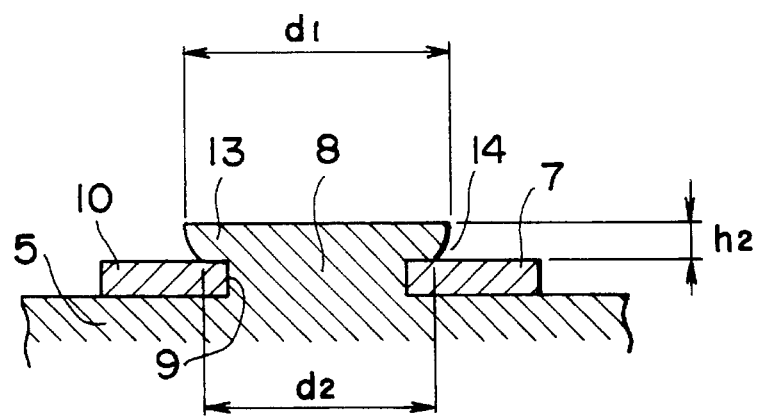
FIG. 11 is an enlarged sectional view of the conventional wear sensor mounting structure.

Incidentally, the friction pads 3 and 4 are each composed of a backing plate 5 and a lining material 6 joined to one side of the backing plate 5. As the number of times of use of the disk brake increases, the lining material 6 wears and gradually decreases in thickness. Accordingly, the conventional practice is to equip each friction pad with a wear sensor 7 that warns the user of the wear limit of the lining material 6, as shown in FIGS. 9 to 11, and to judge by an alarm sounded from the wear sensor 7 that it is time to replace the friction pad with a new one. Although the relationship between a wear sensor and a friction pad will be explained below with regard to the friction pad 3, it should be noted that the same shall apply to the friction pad 4.

The wear sensor 7 has heretofore been attached to the friction pad 3 by the following method: A circular cylindrical projection 8 is formed on the reverse side of the backing plate 5 at an edge portion thereof, and the wear sensor 7 is fitted on the projection 8 and secured to the backing plate 5 by caulking the projection 8, i.e. by plastic deformation of projection 8 to form radially enlarged portion 13 thereof. For example, the wear sensor 7 has a mounting portion 10 which has a bore 9 intimately fittable with the projection 8 and which is secured to the backing plate 5 by caulking the projection 8. The wear sensor 7 further has a spring portion 11 which extends rearward from the mounting portion 10 and is bent in an approximately U-shape at the rear side of the backing plate 5 so as to turn back, and a vibrating portion 12 which extends rectilinearly from the spring portion 11 toward the disk D. When coming in contact with the disk D, the vibrating portion 12 sounds an alarm, thereby informing the user of the wear limit of the lining material 6. It should be noted that the projection 8 is formed by extrusion in which a portion of the obverse side of the backing plate 5 (i.e., the side thereof where the lining material 6 is joined) is indented so as to extrude from the reverse side by using a punch. In FIG. 10, reference numeral 5a denotes an indent formed by the punch.

However, the conventional disk brake equipped with the above-described wear sensor 7 involves the following problem: When the wear sensor 7 is secured by caulking the projection 8 of the backing plate 5, as shown in FIG. 11, the peripheral edge of the reverse side of the radially enlarged portion 13 (i.e., the side thereof which is joined to the wear sensor 7) fails to come in contact with and press against the wear sensor 7, resulting in an ineffective raised portion 14, as a nature of the caulking method. Consequently, the diameter $d_2$ of the surface that is joined to the wear sensor 7 is the minimum diameter of the radially enclosed portion 13, so that the pressing effect is reduced. Therefore, it is likely that the wear sensor 7 will be rotated by moment $M_1$ (see FIG. 9) acting in a plane parallel to the disk surface about the axis of the projection 8, resulting in a failure to sound an alarm.

One conventional approach to solve the above-described problem is to increase the diameter (the maximum diameter) $d_1$ of the radially enlarged portion 13 as much as possible. In this case, however, the height (thickness) $h_2$ of the enlarged portion 13 inevitably is decreased, resulting in reduction of the strength of the enlarged portion 13 itself. Consequently, the edge portion of the enlarged portion 13 may be raised by moment $M_2$ (see FIG. 10) acting in a plane perpendicular to the disk surface about the enlarged portion 13, resulting in a failure to sound an alarm in the same way as the above.

Figure 12:
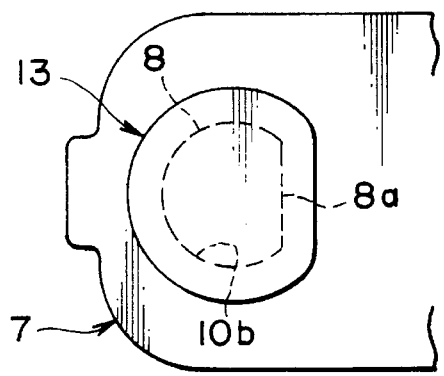
FIG. 12 is a plan view of a modification of the conventional wear sensor mounting structure.
Figure 13:
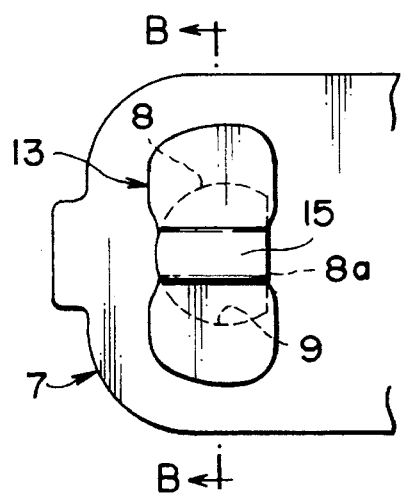
FIG. 13 is a plan view of another modification of the conventional wear sensor mounting structure.
Figure 14:
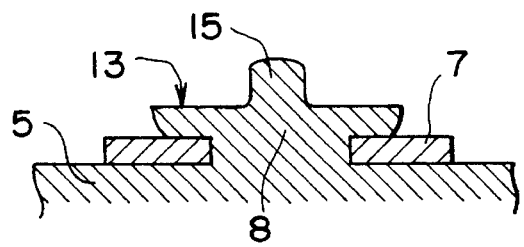
FIG. 14 is a sectional view taken along the line XIV—XIV in FIG. 13.

FIG. 12 shows another conventional approach to solve the problem. A flat portion 8a is provided on a part of the peripheral surface of a projection 8 provided on the backing plate 5 of the friction pad 3. A bore 10b of the wear sensor 7 is aligned with the flat portion 8a, and the wear sensor 7 is secured to the backing plate 5 by caulking the projection 8 as shown by reference numeral 13. FIGS. 13 and 14 show still another conventional approach to the problem, in which, in addition to the arrangement shown in FIG. 12, the central portion of the projection 8 is left unpressed as a projecting portion 15, but only both side edge portions of the projection 8 are deformed by pressing, thereby enhancing the pressing effect of the enlarged portion 13. However, these conventional approaches give rise to a new problem. That is, since the punch that is used to deform the projection 8 must have an irregular shape, the surface pressure applied to the punch during deformation becomes non-uniform, causing the lifetime of the punch to be shortened. As a result, the production cost of the friction pad rises.

In view of the above-described problems associated with the prior art, the present invention is intended to enable a wear sensor to be firmly secured to a backing plate of a friction pad by caulking so that an alarm can be surely sounded, without lowering the productivity of the friction pad.

The inventors have experimentally found a condition that gives the desired mounting strength, and confirmed that the condition is that the diameter $d_1$ and height $h_1$ of a radially enlarged portion of a projection should satisfy the relationship of $(d_1-3.4)\times h_1 \geq 2.5$. The present invention has been accomplished on the basis of this finding.

In the disk brake according to the present invention, the deformed or radially enlarged portion of the projection on the backing plate is so formed that the diameter $d_1$ and height $h_1$ of the enlarged portion satisfy the relationship of $(d_1-3.4)\times h_1 \geq 2.5$, thereby enabling not only the wear sensor to be satisfactorily held on the backing plate but also the enlarged portion to have sufficiently high strength. Thus, it becomes possible to prevent both rotation of the wear sensor and rising of the peripheral portion of the radially enlarged portion, and hence it is possible for the wear sensor to sound an alarm without fail.

Embodiments of the present invention will be described below with reference to the accompanying drawings.

Figure 1:
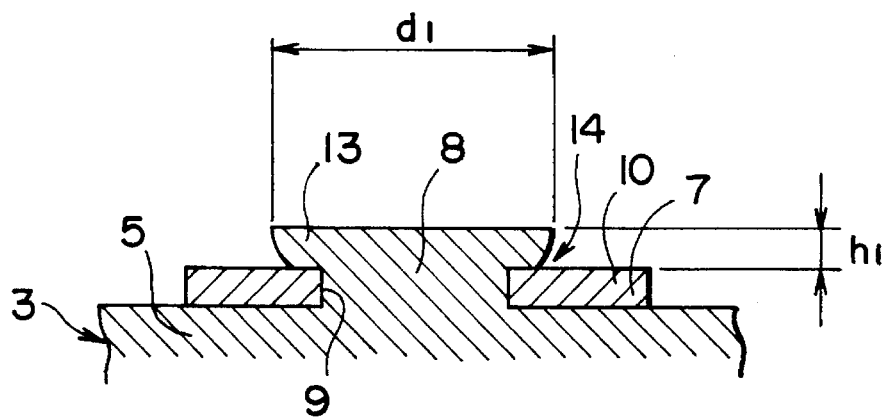
FIG. 1 is a sectional view showing a wear sensor mounting structure on a friction pad according to a first embodiment of the present invention.
Figure 2:
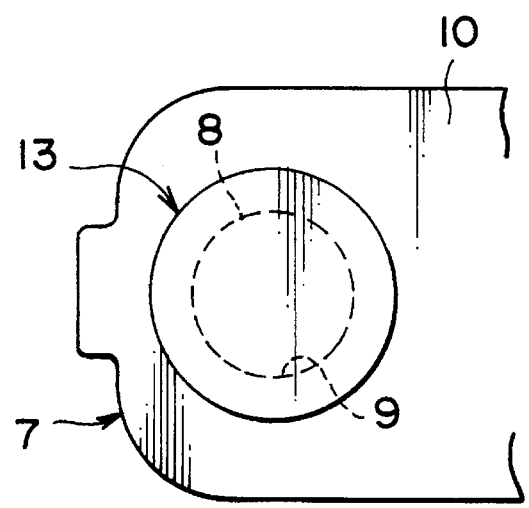
FIG. 2 is a plan view of the wear sensor mounting structure shown in FIG. 1.

FIGS. 1 and 2 show a first embodiment of the friction pad for a disk brake according to the present invention. It should be noted that the general structure of the disk brake is the same as that shown in FIG. 8, and the configuration of the wear sensor is also the same as that shown in FIGS. 9 to 1. Therefore, in FIGS. 1 and 2 only an essential part of the embodiment is shown, and the same portions as those of the prior art are denoted by the same reference numerals. Although description will be made only of the friction pad 3 in the following embodiments of the present invention, it should be noted that the description is also applicable to the friction pad 4. In the first embodiment, the backing plate 5 of the friction pad 3 has a circular cylindrical projection 8 formed by extrusion, and the wear sensor 7 is secured to the backing plate 5 by caulking the projection 8, with the bore 9 provided in the mounting portion 10 fitted with the projection 8, in the same way as in the prior art.

The head or radially enlarged portion 13 has an ineffective portion 14 at the peripheral edge of the side thereof which is joined to the wear sensor 7. Accordingly, the force with which the enlarged portion 13 restrains the wear sensor 7 may be insufficient, depending upon the size of the enlarged portion 13, so that the wear sensor 7 is likely to become loose (rotates or lifts) as it comes in contact with the disk D, resulting in a failure to sound an alarm. Therefore, in the first embodiment, the projection 8 was experimentally deformed so that the dimensions of the enlarged portion 13, that is, the maximum diameter $d_1$ and height $h_1$ thereof, variously changed. After the caulking process, the wear sensor 7 was subjected to rotating force acting about the axis of the projection 8 or lifting force acting in the direction normal to the plane of the backing plate 5, and the condition of displacement of the wear sensor 7 was observed. It should be noted that the rotating force and lifting force were set at approximately the same level as that of force acting on the wear sensor 7 when coming in contact with the disk D.

Figure 3:
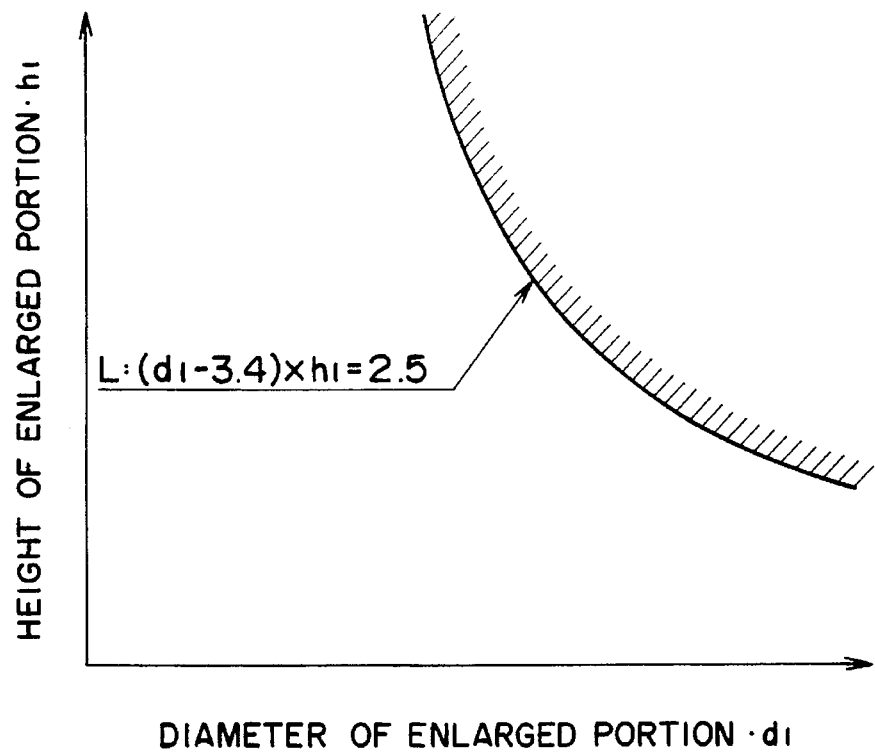
FIG. 3 is a graph showing the dimensional relationship between the height and diameter of a radially enlarged portion for clamping a wear sensor by caulking.

As a result, it has become clear that, as shown in the graph of FIG. 3, neither rotation of the wear sensor 7 nor rising of the deformed or enlarged portion 13 occurs as long as the maximum diameter $d_1$ and height $h_1$ of the enlarged portion 13 lie above the line L representing the relationship of $(d_1-3.4)\times h_1 \geq 2.5$ that is, within the range (shown by hatching in the graph) where the condition of $(d_1-3.4)\times h_1 \geq 2.5$ is satisfied. In this case, the projection 8 formed on the backing plate 5 has a circular cross-sectional configuration. Accordingly, the projection 8 can be formed by extrusion using a usual circular punch, and there is no likelihood that the lifetime of the punch will be reduced.

Figure 4:
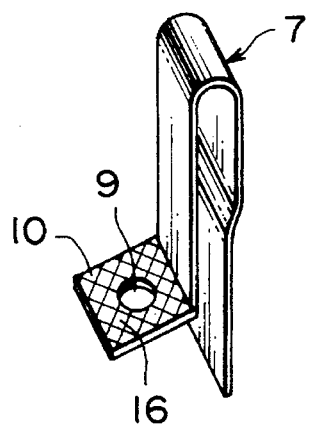
FIG. 4 is a perspective view showing one example of the configuration of a wear sensor.
Figure 5:
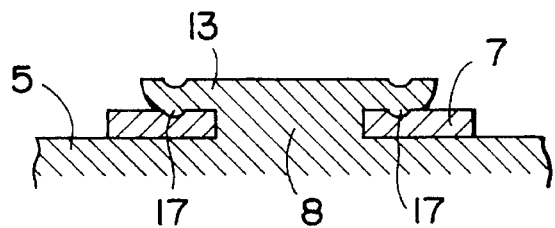
FIG. 5 is a sectional view showing a modification of the wear sensor mounting structure.

It should be noted that, as shown in FIG. 4, the wear sensor 7 in the first embodiment may have lattice grooves 16 in the upper surface of the mounting portion 10, which is previously formed by knurling. In this case, the surface wall of the enlarged portion 13 bites into the lattice grooves 16, thereby suppressing sliding of the wear sensor 7. Thus, rotation of the wear sensor 7 is prevented even more reliably. The enlarged portion 13 may have local projecting portions 17, as shown in FIG. 5. The projecting portions 17 may be formed at the same time as the projection is caulked so that the projecting portions 17 bite into the mounting portion 10, and portions of the mounting portion 10 which are pressed by the projecting portions 17 bite into the backing plate 5. Thus, the projecting portions 17 function as detents, and rotation of the wear sensor 7 is prevented even more reliably.

Figure 6:
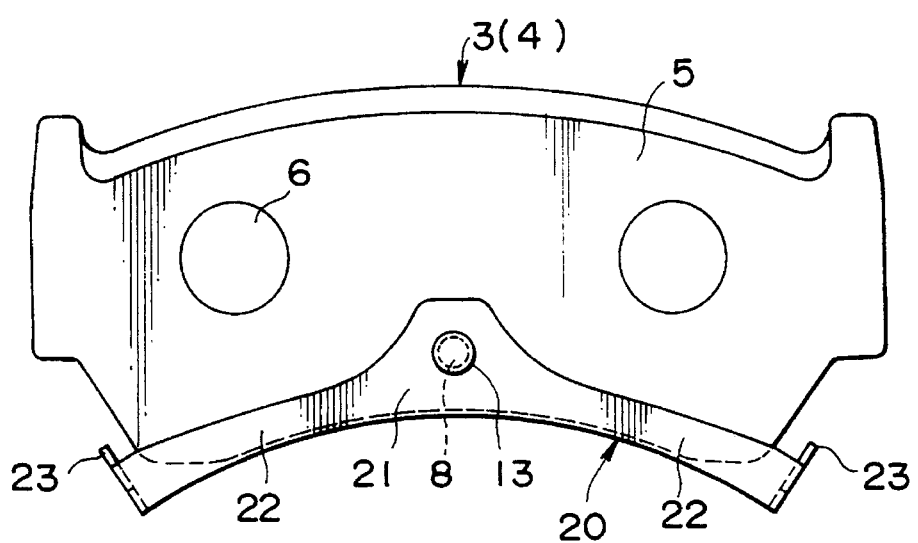
FIG. 6 is a plan view showing a wear sensor mounting structure on a friction pad according to a second embodiment of the present invention.
Figure 7:
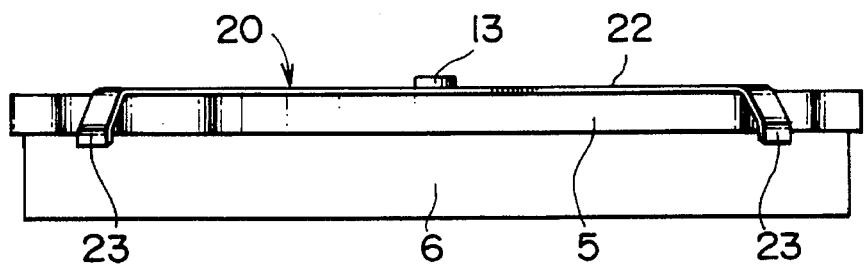
FIG. 7 is a side view of the wear sensor mounting structure shown in FIG. 6.

FIGS. 6 and 7 show a second embodiment of the present invention. The feature of the second embodiment resides in that the dimensional relationship as in the first embodiment is applied to a disk brake having a boomerang-shaped wear sensor 20. A projection 8 is provided in the center of the lower side of the backing plate 5 of the friction pad 3, and a mounting portion 21 of the wear sensor 20, which is formed in the center of the sensor 20, is fitted onto the projection 8 and secured to the backing plate 5 by caulking the projection 8. The wear sensor 20 has arm portions 22 extending leftward and rightward, respectively, from the mounting portion 21, and vibrating portions 23 which are bent toward the disk D from the respective distal ends of the arm portions 22. When coming in contact with the disk D, the vibrating portions 23 sound an alarm. In the second embodiment also, the projection 8 is so caulked that the maximum diameter $d_1$ and height $h_1$ of the radially enlarged portion 13 satisfy the relationship of $(d_1 03.4) \times h_1 \geq 2.5$. By doing so, both rotation of the wear sensor 20 and rising of the enlarged portion 13 are prevented, and thus an alarm can be surely sounded. It should be noted that the mounting portion 21 of the wear sensor 20 may also be subjected to the above-described knurling. In such a case, rotation of the wear sensor 20 can be prevented even more reliably.

As has been detailed above, according to the present invention, the radially enlarged portion of the projection provided on the backing plate of the friction pad is formed into a predetermined desired size, whereby the wear sensor is prevented from becoming loose and hence is capable of sounding an alarm without fail. Further, since the projection on the backing plate has a circular cylindrical shape, it can be formed by extrusion using a usual general-purpose circular punch. Accordingly, the wear sensor can be firmly secured to the backing plate without lowering the productivity of the friction pad, and thus the production cost can be minimized.

What is claimed is:

1. A friction pad for a disk brake, said friction pad comprising:

a backing plate and a lining material joined thereto;

said backing plate having formed thereon by extrusion a circular cylindrical projection;

a wear sensor fitted onto said projection and adapted to generate an alarm upon contacting a disk of the disk brake;

said wear sensor being secured to said backing plate by a radially enlarged portion of said projection resulting from plastic deformation thereof; and said radially enlarged portion having a diameter ($d_1$) and a height ($h_1$) satisfying the relationship $(d_1 - 3.4) \times h_1 \geq 2.5$ mm.

2. A friction pad as claimed in claim 1, wherein said wear sensor has a mounting portion clamped between said radially enlarged portion and said backing plate, and said mounting portion has a toughened surface on a side thereof facing said radially enlarged portion.

3. A friction pad as claimed in claim 2, wherein said radially enlarged portion has a projecting portion extending from said radially enlarged portion toward said backing plate.

4. A friction pad as claimed in claim 3, wherein said projecting portion bites into said mounting portion of said wear sensor.

5. A friction pad as claimed in claim 1, wherein said radially enlarged portion has a projecting portion extending from said radially enlarged portion toward said backing plate.

6. A friction pad as claimed in claim 5, wherein said projecting portion bites into said wear sensor.

* * * * *

UNITED STATES PATENT AND TRADEMARK OFFICE
CERTIFICATE OF CORRECTION

PATENT NO. : 5,520,265
DATED : May 28, 1996
INVENTOR(S) : Kinzo KOBAYASHI et al.

It is certified that error appears in the above-indentified patent and that said Letters Patent is hereby corrected as shown below:

Column 6, Claim 1, line 23, change "mm" to -- [mm] --.

Signed and Sealed this

Sixth Day of August, 1996

Attest:

BRUCE LEHMAN

Attesting Officer   Commissioner of Patents and Trademarks